Patented Aug. 2, 1938

2,125,743

UNITED STATES PATENT OFFICE 2,125,743

CATALYST AND PROCESS FOR HYDROGEN PRODUCTION

William J. Sweeney and William E. Spicer, Baton Rouge, La., assignors to Standard Oil Development Company, a corporation of Delaware No Drawing. Application December 24, 1935, Serial No. 56,088

8 Claims. (Cl. 23—212)

This invention relates to the method of producing hydrogen by the reaction between a hydrocarbon, usually methane, and steam in the presence of a catalyst. The particular object of this invention is the provision of such a process in which the reacting materials are contacted with a catalyst having more rugged nature and a higher activity than those hitherto employed.

In the production of hydrogen from hydrocarbons and steam the reaction gases are usually conducted through an elongated upright reaction space which is packed with a catalyst. Due to the fact that the reaction temperature is relatively high and the stream of reaction gases is quite rapid, together with the fact that the catalyst employed is of comparatively heavy nature, the portion of the catalyst in the lower part of the tower rapidly disintegrates and becomes unsuitable both by reason of loss of effective surface and by reason of the fact that the fine material formed by disintegration becomes a serious obstruction to the passage of the gaseous reaction material.

A great many catalysts having satisfactory activity for this process have been proposed. In many instances these catalysts are carried by supports such as pumice, which possess a very high resistance to crushing force. Such catalysts, however, are accompanied by the disadvantage that the amount of active material such as nickel which can be deposited is limited and after some usage the mixture of nickel and the other catalyst ingredient tends to peel off from the support.

We have now found that satisfactory strength can be imparted to catalysts composed of one or more metals of the iron group in conjunction with a difficultly reducible oxide, as a major ingredient, by adding to the catalyst mixture a small amount of a substance which will react with the difficultly reducible oxide, at a temperature above that usual for the methane-steam reaction, usually at about 1600° F., to form a compound having a melting point above the melting point at which it is desired to conduct the methane-steam reaction and heating the mixture to the temperature at which the added substance and the oxide can react. In case the difficultly reducible oxide associated with the metal of the iron group is of acidic nature, the added substance is preferably a basic oxide such as magnesia or lime, or barium oxide. If, on the other hand, the difficultly reducible oxide associated with the metal of the iron group is of basic nature, the substance added to impart strength is preferably an acidic oxide such as alumina, boric acid, chromium oxide, molybdic acid, tungstic acid, etc. Where the difficultly reducible oxide is amphoteric, the added substance should preferably be of acidic nature, such as boric acid or phosphoric acid. In some instances the substance added may be a salt of fluorine, a silicate, or a hydrophosphate which is capable of reacting with the oxide associated with the metal of the iron group to form a high melting double salt.

Wherever in the specification or in the appended claims an acidic substance is mentioned, reference is had to a substance which, in water solution, gives an acid reaction or which, in a chemical compound, constitutes all or part of the anion. Wherever a basic substance is mentioned, reference is had to a substance which, in water solution, gives an alkaline reaction or, in a chemical compound, constitutes all or part of the cation.

In the preparation of catalysts for the methane-steam reaction a difficultly reducible oxide is impregnated with a water solution of a nickel salt, usually nickel nitrate, the mixture is roasted to dryness at a sufficiently high temperature to convert the nickel nitrate into nickel oxide and the mixture is then reduced at an elevated temperature by hydrogen so as to convert the nickel oxide to metallic nickel. To obtain a more intimate mixture of the nickel and the difficultly reducible oxide, solutions of salts of both may be mixed and the mixed hydroxides of both may be mixed and the mixed hydroxides of both may be precipitated by the addition of ammonia or any other suitable precipitating agent. In such case the further treatment of the catalyst mixture is the same as mentioned above. In any case, in the methods normally employed for the production of these catalysts the roasting and reducing steps are carried out at temperatures usually not in excess of 600° C.

It has already been proposed to prepare the catalyst for this reaction by causing a nickel salt to react with a metal acid or a salt thereof to produce a nickel metallate such as nickel chromate. The purpose of this procedure is to obtain a more intimate mixture of the nickel and the metal oxide, such a mixture being formed upon subjecting the nickel metallate to the roasting and reducing conditions. This must necessarily be the case because the nickel, in order to exert the desired activity, must be present in the reaction chamber in the metallic state.

According to the process of the present invention the substance which is to be added to the metal oxide associated with the nickel may be added at any stage of the process prior to the final heating step. For example, it may be added during the initial mixing step or prior to or after the roasting step. Addition during the initial mixing step in the wet state is the preferred procedure. Otherwise the procedure for preparing the catalyst according to the present invention is the same as the conventional procedure except that, in addition to the usual roasting and reducing step involved in the conventional procedure, the present process includes the high temperature heating step to a temperature substantially above the temperature at which the methane-steam reaction is to be conducted. This high temperature heating step is essential because the substance employed, according to the present invention, to increase the strength of the catalyst does not produce the desired effect at the temperatures usually employed for the methane-steam reaction.

The changes which occur during the high temperature heating step of the process of the present invention are not clearly understood. It may be that one of the reaction substances melts, thereby forming a physical bond between the various particles of the catalyst whether or not a reaction occurs. Again it may be that a reaction product is formed and is fused at the temperature employed and constitutes the physical bond. In any event, the heating step, when conducted at a sufficiently high temperature, usually at least 1700° F., with the addition of the strength increasing substance, effects a marked increase in the strength of the catalyst.

According to the present invention the catalyst is preferably employed in pilled form. It was the impossibility of including strong, solid, natural substances in lump form in catalysts which are to be pilled which led to the difficulties to the avoidance of which the present invention is directed. In the preparation of pilled catalysts the substance which is added for strengthening the catalyst according to the present invention is introduced into the catalyst mixture prior to the molding step, and the roasting and reducing steps are usually carried out after the molding step and before the final heating step, although the reducing step may be conducted after the high temperature heating step, a separate roasting step being omitted.

An especially active catalyst previously suggested for the methane-steam reaction is a catalyst composed of nickel and magnesia. This catalyst preferably contains a large amount of magnesia and nickel, and catalytic compositions containing 25% nickel and 75% magnesia are preferred. This catalyst, however, has been found to be particularly fragile at preferred operating conditions such as at a temperature of about 1400° F.

We have found that this nickel magnesia catalyst can be rendered eminently satisfactory from the point of view of mechanical strength by being subjected to our strength improving process. The inorganic compound added to this mixed catalyst for the purpose of improving strength is preferably one which has a melting point below about 1500° F., in order to secure intimate mixing and rapid reaction between the added component and the magnesia. Examples of compounds which may be added to the nickel magnesia catalyst, as well as to other catalysts treated according to the present invention, are the acids, oxides and salts of fluorine, silicon, tin, germanium, bismuth, aluminum, lead, boron, cobalt, tungsten, phosphorous, chromium, molybdenum, manganese, and the like, such as sodium fluoride, silica, sodium silicate, alumina, boric acid, chromium oxide, cobalt oxide, molybdic acid, tungstic acid, phosphoric acid, etc. Weakly acidic compounds, such as boric acid and tungstic acid, are preferred.

Such compounds should be added in small amounts varying between ½% and 10% and preferably not in excess of 5% of the total catalyst mixture. We have found that such minor amounts of the added substance are sufficient to impart the desired strength to the catalyst without impairing its activity, whereas when amounts substantially in excess of 10% are employed, the strength of the resulting catalyst is not appreciably greater and its activity may be considerably less due to the fact that an extensive reaction between the added substance and the difficultly reducible oxide may cause a coating to form over some of the catalytically effective surface.

The mixture of the metal of the iron group, the difficultly reducible oxide and the added substance is heated to a temperature considerably above that at which the catalyst would be employed, usually at a temperature of about 2000° F., for a sufficient length of time to permit the difficultly reducible oxide and the added substance to react at least in part, or at any rate, to effect the desired increase in strength. The temperature to which the mixture is heated will of course depend on the constituents of the mixture. In general the time of the heating step, for a given increase in strength, may be said to vary inversely with the temperature.

In some instances a catalyst may be composed of a metal of the iron group, usually nickel, as a minor ingredient, and two or more difficultly reducible oxides, in large amounts, which serve to support and give increased surface to the catalyst. Where these difficultly reducible oxides are of a nature such as they are capable of reacting to form a high melting compound, the catalyst mixture, upon being heated to a high temperature, above 1600° F., will of course become stronger without the addition of any further substance. It is practically impossible to control the heating step in such a case, however, so as to avoid a decrease in the activity of the catalyst due to a too extensive reaction of the reactive components when a temperature sufficiently high to cause them to react is employed. In such cases, it is preferable, according to the present invention, to add to the catalytic mixture a small amount of a substance which has a greater affinity for one of said oxides than does the other said oxide and to conduct the heating step at a somewhat lower temperature, but still above 1600° F. than that which favors the reaction between the two oxides. For example, where the catalyst is initially composed of nickel and large amounts of alumina and magnesia and requires a temperature of about 2000° F. for strengthening, a small amount of a substance such as boric acid is added and the heating step is conducted at about 1800° F.

In all cases it is advisable to select as an addition agent for the catalyst a substance for which the difficultly reducible oxide has a positive chemical affinity. For example, where the difficultly reducible oxide is alumina, boric acid is distinctly superior to magnesia as the addition agent. Likewise, where the difficultly reducible oxide is magnesia, boric acid is measurably superior to alumina as an addition agent. Again, when the difficultly reducible oxide is acidic in nature, such as chromium oxide, a substance such as magnesia should be used as the addition agent in preference to an amphoteric oxide such as alumina.

The following examples are presented to illustrate one suitable method for using the present invention, and is not to be construed as limiting this invention in any way:

Example I 1455 parts, by weight, of nickel nitrate hexahydrate were dissolved in 500 parts of water, to which 22 parts of boric acid were added. 750 parts of magnesium oxide were then slowly added to the solution, with stirring, and the resulting paste was dried and heated at about 850–900° F. to convert the nitrate to oxide and to drive off oxides of nitrogen. The heated powder was passed through a 10 mesh screen and was then formed into a dense mass by compression under high pressure. This is suitably done in a tablet machine, using pressures of the order of 10,000 pounds per square inch or higher. The tablets first formed may be made again even stronger by being crushed to about 10 mesh, and then again formed into tablets. The tablets formed by subjecting the heated powder to this double tabletting operation were then heated to a temperature of 1700 to 2000° F. for about 36 hours. The nickel oxide in the heated tablets was then reduced to metallic nickel by passing hydrogen over them for about 6 hours at about the same temperatures. The resulting tablets were active catalysts for the production of hydrogen by reaction of methane and steam, a gas containing 0.9% methane being obtained on passing 250 volumes of methane per hour and excess steam over the tablets in an externally heated reaction tube maintained at 1525° F.

The strength of the tablets thus prepared is much greater than that of tablets prepared in the same manner but without the addition of the boric acid. A comparison of the minimum pressure required to crush the tablets, with and without addition of boric acid, is given in the following table:

|  | Strength of tablets, pounds per sq. inch | |
| --- | --- | --- |
|  | Before heating | After heating |
| Tablets with 2% boric acid | 1020 | 4150 |
| Tablets without boric acid | 700 | 1890 |

Example II

Pills of a nickel magnesia catalyst were made according to the procedure described in Example I. Three other batches of pills were made of the same nickel magnesia mixture containing respectively 2% of boric acid, 5% of sodium fluoride and 4% of phosphoric acid. The strength of these pills was measured, they were heated for several hours at 1700° F., after which their strength was measured again and then they were used in the methane-steam conversion at a temperature between 1500° and 1700° F. for a given period after which their strength was again measured. These pills were all the same size and shape. The crushing force was measured as pounds per pill. The results obtained were as follows:

| Catalyst | Before heating | After heating | After use |
| --- | --- | --- | --- |
| Ni—MgO | 25 | 22 | 16 |
| Ni—MgO+2% $H_3BO_3$ | 23 | 35 | 36 |
| Ni—MgO+5% NaF | 20 | 42 | 77 |
| Ni—MgO+4% $H_3PO_4$ | 20 | 31 | 38 |

Example III

The nickel magnesia catalyst of the preceding example when heated at 2100° F. for 20 hours had a strength of 15 lbs. per pill. Two per cent of boric acid added to the pills in the manner described increased the strength after the same heating step to 97 lbs. per pill. Ten per cent of boric acid increased the strength to 82 lbs. per pill. Two per cent of cobalt oxide increased the strength to 57 lbs. per pill. One-half per cent of sodium fluoride increased the strength to 60 lbs. per pill. Two per cent of sodium fluoride increased the strength to 80 lbs. per pill. Five per cent of sodium fluoride increased the strength to 77 lbs. per pill. Four per cent of phosphoic acid increased the strength to 38 lbs. per pill.

Example IV

In order to determine the effect of time of heating and temperature of heating on the strength of the catalyst produced, a nickel magnesia catalyst of the composition set forth in Example I containing 2% of boric acid was heated at successively higher temperatures for 20 to 22 hours and the strength of the pills after each heating step was measured. The results were as follows:

| Temperature | Initial strength | After heating |
| --- | --- | --- |
| 1600 | 1020 | 2160 |
| 1800 | 1020 | 4100 |
| 2000 | 1020 | 5450 |

In this table strength is given as pounds per square inch.

The same catalyst was heated for different periods at two different temperatures. The results were as follows:

| Hours | 1800° F. | 2000° F. |
| --- | --- | --- |
| 12–14 | 1860 | 3650 |
| 20–22 | 3100 | 5100 |

The catalysts described in Examples II, III, and IV exhibited substantially the same activity in the methane steam reaction as the catalysts described in claim 1.

Various modifications may obviously be made in the methods described above without departing from the scope of this invention which is not to be limited by any examples or explanations presented herein, all of which are presented solely for purpose of illustration. This invention is to be limited only by the following claims, in which it is desired to claim all novelty insofar as the prior art permits:

We claim:

1. A process for the production of hydrogen, which comprises passing a hydrocarbon gas and steam at a reacting temperature of about 1500 to 1700° F. over a catalyst in the form of pills, comprising about 25% nickel and about 75% magnesia, and obtained by admixing nickel, magnesia, and about 1% of boric acid, reducing said mixture to a powdered form, molding said powder into pills, and heating said pills to a temperature above 1700° F. for a sufficient length of time to materially increase their mechanical strength.

2. A process for the production of hydrogen which comprises passing a hydrocarbon and steam at a reacting temperature over a catalyst comprising a metal of the iron group as a minor constituent and magnesia as a major constituent, which catalyst has been prepared by adding thereto from ½ to 5% of boric acid, subjecting the catalyst after said addition to a temperature sufficiently high above the said hydrocarbon-steam reaction temperature and for a sufficient length of time to produce a mechanically strong compound having a melting point substantially above the said reaction temperature for the hydrocarbon-steam reaction.

3. A process according to claim 2 in which the metal of the iron group employed is nickel.

4. A process in accordance with claim 2 in which the metal of the iron group employed is nickel and the magnesia constitutes at least 50% of the catalyst mixture and the boric acid constitutes less than 5% of the catalyst mixture.

5. A process for the production of hydrogen which comprises passing a hydrocarbon and steam at a reacting temperature over a catalyst comprising a metal of the iron group as a minor constituent and a difficultly reducible metal oxide selected from the class consisting of alumina and magnesia as a major constituent, which catalyst has been prepared by adding from ½ to 5% of boric acid, subjecting the catalyst after said addition to a temperature sufficiently high above the said hydrocarbon-steam reaction temperature and for a sufficient length of time to produce a mechanically strong compound having a melting point substantially above the said reaction temperature for the hydrocarbon-steam reaction.

6. A process for the production of hydrogen which comprises passing a hydrocarbon and steam at a reacting temperature over a catalyst comprising a metal of the iron group as a minor constituent and alumina as a major constituent, which catalyst has been prepared by adding thereto from ½ to 5% of boric acid, subjecting the catalyst after said addition to a temperature sufficiently high above the said hydrocarbon-steam reaction temperature and for a sufficient length of time to produce a mechanically strong compound having a melting point substantially above the said reaction temperature for the hydrocarbon-steam reaction.

7. Process in accordance with claim 6 in which the metal of the iron group employed is nickel.

8. A process for the production of hydrogen which comprises passing a hydrocarbon and steam at a reacting temperature over a catalyst comprising a metal of the iron group as a minor constituent and a difficultly reducible metal oxide selected from the class consisting of alumina and magnesia as a major constituent, which catalyst has been prepared by adding from ½ to 5% of boric acid, subjecting the catalyst after said addition to a temperature sufficiently high above the said hydrocarbon-steam reaction temperature and above 1700° F. and for a sufficient length of time to produce a mechanically strong compound having a melting point substantially above the said reaction temperature for the hydrocarbon-steam reaction.

WILLIAM J. SWEENEY.
WILLIAM E. SPICER.